(12) United States Patent
Le

(10) Patent No.: US 9,036,916 B2
(45) Date of Patent: May 19, 2015

(54) UNIQUE PART IDENTIFIERS

(71) Applicant: Apple Inc., Cupertino, CA (US)

(72) Inventor: Duy P. Le, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 17 days.

(21) Appl. No.: 13/629,561

(22) Filed: Sep. 27, 2012

(65) Prior Publication Data

US 2014/0086474 A1  Mar. 27, 2014

(51) Int. Cl.
  *G06K 9/46* (2006.01)
  *G06K 9/00* (2006.01)
(52) U.S. Cl.
  CPC .... *G06K 9/00577* (2013.01); *G06K 2009/0059* (2013.01)
(58) Field of Classification Search
  None
  See application file for complete search history.

(56) References Cited

U.S. PATENT DOCUMENTS

| | | | |
|---|---|---|---|
| 5,619,025 A * | 4/1997 | Hickman et al. | 235/454 |
| 6,986,462 B2 | 1/2006 | Venkatesh et al. | |
| 7,127,104 B2 * | 10/2006 | Prasad et al. | 382/164 |
| 8,050,469 B2 | 11/2011 | Kaus et al. | |
| 8,471,345 B2 * | 6/2013 | Bond et al. | 257/414 |
| 2004/0047509 A1 | 3/2004 | Masten | |
| 2006/0083419 A1 | 4/2006 | Carbaugh et al. | |
| 2008/0185430 A1 | 8/2008 | Goldbach | |
| 2008/0292178 A1 | 11/2008 | Sones et al. | |
| 2010/0138435 A1 | 6/2010 | Lesperance et al. | |
| 2012/0263381 A1 * | 10/2012 | Yoshida | 382/189 |
| 2013/0022238 A1 * | 1/2013 | Wood et al. | 382/103 |
| 2013/0170758 A1 * | 7/2013 | G | 382/218 |
| 2014/0205153 A1 * | 7/2014 | Sharma et al. | 382/109 |

* cited by examiner

*Primary Examiner* — Sumati Lefkowitz
*Assistant Examiner* — David Perlman
(74) *Attorney, Agent, or Firm* — Womble Carlyle Sandridge & Rice LLP

(57) ABSTRACT

A method of providing a unique identifier for a manufactured part includes defining a boundary area on at least one surface of the manufactured part, recording surface properties within a portion of the boundary area, interpreting the recorded surface properties with a pattern recognition algorithm to create the unique identifier, and storing the unique identifier in a database.

21 Claims, 10 Drawing Sheets

UNIQUE PART IDENTIFIERS

FIELD OF THE DESCRIBED EMBODIMENTS

The described embodiments relate generally to identification, and more particularly, to identification of devices or parts thereof through unique identifiers.

BACKGROUND

Conventionally, device and part manufacturers may assign serial numbers to individual products or portions of products for discerning origin information, for identifying manufacturing information of defective parts, for anti-counterfeit measures, or for other uses. Conventional serial number assignment methodologies include physically labeling a part with the pre-assigned serial number. It follows that physical labeling may be tampered with, for example, through changing, re-labeling, removing, or other manipulation.

Accordingly, what is needed is a process or processes for device and part identification that reduces the possibility of physical tampering.

SUMMARY OF THE DESCRIBED EMBODIMENTS

This paper describes various embodiments that relate to methodologies of implementing a natural and unique part identifier which uses naturally occurring surface properties along a defined area.

According to one embodiment of the present invention, a method of providing a unique identifier for a manufactured part includes defining a boundary area on at least one surface of the manufactured part, recording surface properties within a portion of the boundary area, interpreting the recorded surface properties with a pattern recognition algorithm to create the unique identifier, and storing the unique identifier in a database.

According to one embodiment of the present invention, a method of providing a unique identifier for a manufactured part includes defining a boundary area on at least one surface of the manufactured part, capturing an image of a portion of the boundary area, interpreting the captured image to create the unique identifier, and storing the unique identifier in a database.

According to one embodiment of the present invention, a system for assigning a unique identifier to a manufactured part includes an imaging device configured to capture at least one image of a portion of a defined boundary area on at least one surface of the manufactured part, a controller in operative communication with the imaging device configured to interpret the captured image to create the unique identifier, and a database in operative communication with the controller configured to store the created unique identifier.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

Various aspects of this disclosure may be better understood upon reading the following detailed description and upon reference to the drawings in which.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

According to embodiments of the invention, systems and methods have been provided which significantly increase the difficulty in producing counterfeit serial numbers for parts. For example, unique surface features which vary uniquely between each part may be identified, quantified, and translated into serial numbers for use in identifying the parts. The serial numbers may be stored in a database for retrieval/authentication in subsequent processing. The unique surface features may include grain boundary patterns, attributes of the same (e.g., number of nodes, segments, vertices, etc), crystal orientation or patterns between grain boundaries, and/or other suitable attributes.

Figure 1:
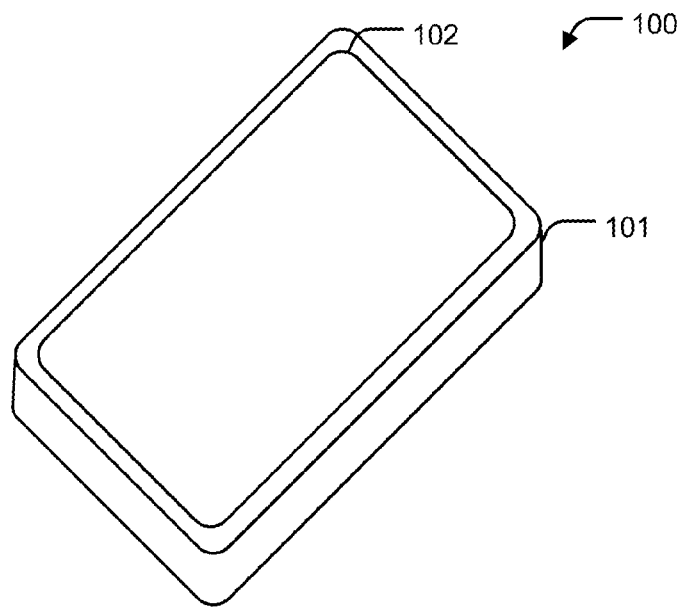
FIG. 1 is a perspective view of a manufactured device.

Turning to FIG. 1, a perspective view of a device 100 is illustrated. The device 100 may include a housing 101 and an interface portion 102. The housing 101 may be an suitable housing, and may include a plurality of individual panels, joints, segments, bands, inlays, and/or other features. According to one embodiment, the housing 101 is formed substantially from a metal or metal alloy. The metal or metal alloy may include aluminum, stainless steel, or titanium. According to one embodiment, the housing 101 includes a panel or window formed of glass, ceramic, or a compound of the two. The panel may be a radio-transparent or substantially radio-transparent window for wireless communication. The interface portion 102 may be integrally or fixedly attached to the housing 101 through a variety of forms of attachment including adhesive, snap-construction, fasteners (e.g., screws, bolts, etc.) or any other suitable forms of attachment.

Although particularly illustrated in a rectangular form, it should be understood that FIG. 1 is illustrative of only a single aspect of the invention, and can take a plurality of forms. Furthermore, it should be readily understood that the methodologies discussed herein are applicable to any form of a part, including individual parts for forming a housing or other component of a device.

Figure 2:
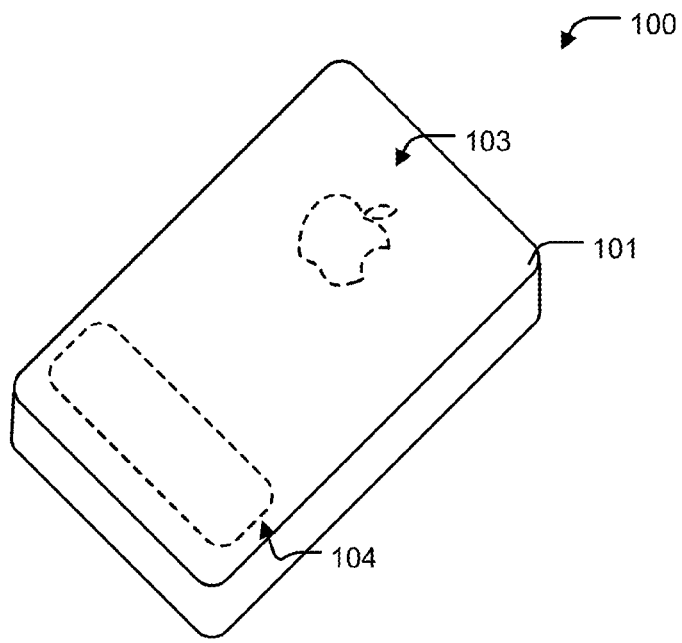
FIG. 2 is an alternate perspective view of the device of FIG. 1.

FIG. 2 is an alternate perspective view of the device 100. As shown, the housing 101 may include one or more markings or indicia 103 and 104, including, for example, a corporate logo or serializing indicia 104. The location of the indicia may be relatively stable and easily located amongst a plurality of different iterations of the housing 101. Therefore, a portion or entirety of the indicia 103 and/or 104 may be used in defining a boundary region as described herein. Alternatively, optical fiducial markers may be used for defining a boundary region or at least identifying a portion of a boundary region. Optical fiducial markers may include cross-hairs, dots, barcodes (both single and two-dimensional), or any other suitable fiducial marker. Furthermore, physical corners, segments, boundaries, and/or edges may also be used to at least partially define a boundary region as described herein. Moreover, cosmetic or surface treatments may be used to define at least a portion of a boundary region (e.g., contrast between a texture and smooth interface on a surface). Even further, any other form of defining a boundary region and functional equivalents should be included in the scope of embodiments of the invention.

Hereinafter, a more detailed discussion of boundary regions and their application in unique identification of parts is described more fully with reference to FIGS. 3-4.

Figure 3:
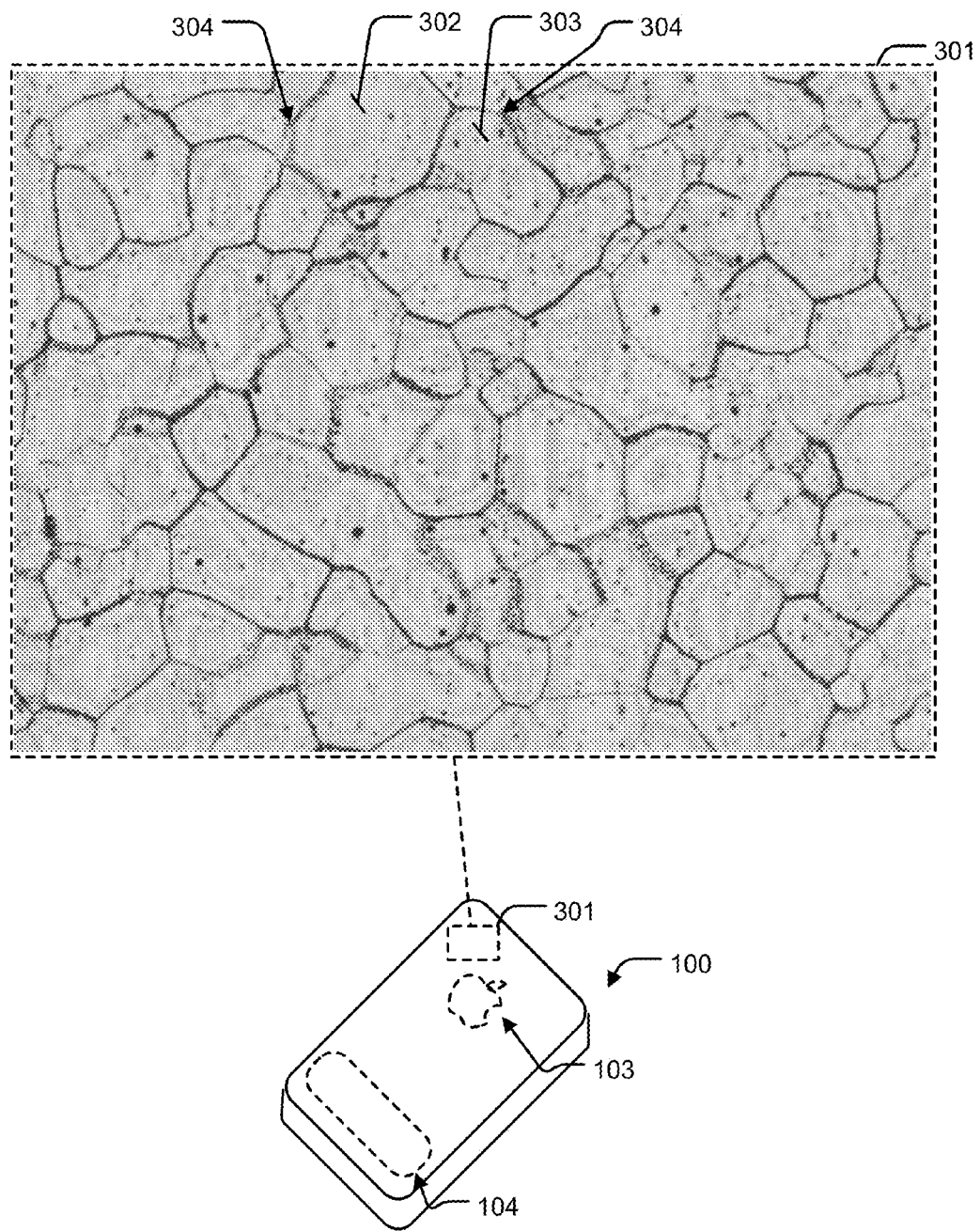
FIG. 3 is an expanded view of a portion of a surface of the device of FIG. 1.

FIG. 3 is an expanded view of a portion of a surface of the device 100. The expanded portion is noted by the broken line which defines a boundary region 301 on a portion of a surface of the device 100. Upon magnification of the boundary region 301, a plurality of grain boundary patterns are visible and discernible by an imaging device. The grain boundary patterns include a plurality of nodes 304 and associated segments which further define individual grain regions 302 and 303. Each individual grain region is unique across a plurality of parts due to variations in the structure of the material comprising the device 100 (e.g., aluminum or other metals). Therefore, the boundary region 301 includes a unique pattern of grain boundary regions which may be used to uniquely identify the device 100, for example, somewhat similar to a fingerprint varying across a plurality of persons in a population. As such, through quantification of at least a portion of the pattern contained in boundary region 301, a unique and natural part identifier may be interpreted for formal assignment to the device 100. Furthermore, recreation of the unique grain pattern of the boundary region 301 may be difficult, and therefore counterfeiting may be reduced.

Figure 4:
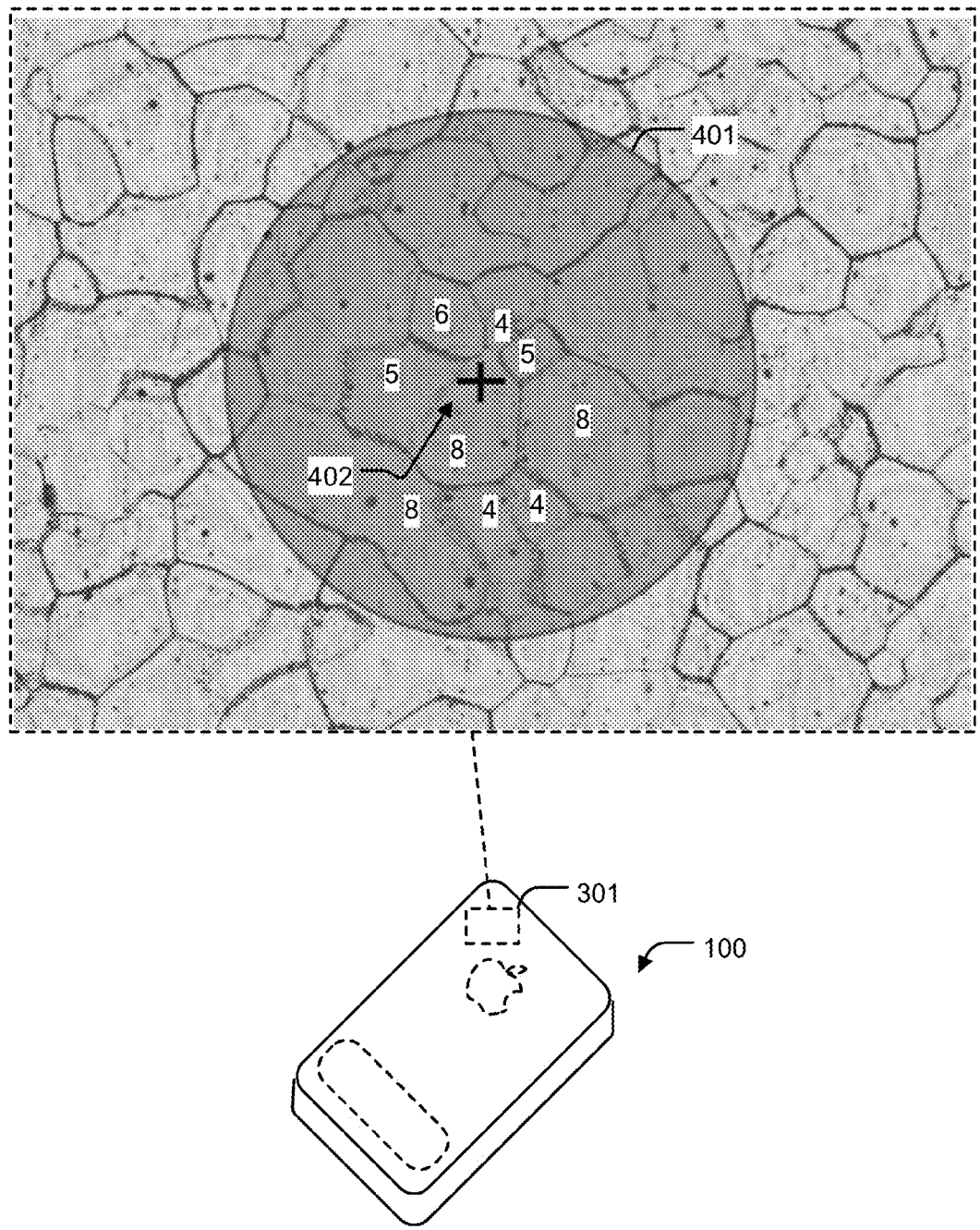
FIG. 4 is an interpreted expanded view of a portion of a surface of the device of FIG. 1, according to an embodiment of the invention.

Turning to FIG. 4, an example pattern-recognition algorithm is described with reference to the boundary region 301 and its unique pattern.

As illustrated, a portion 401 of the surface features within the boundary region 301 may be examined. The portion 401 may be identified through an optical fiducial marker 402 applied to the surface. Alternatively, the portion 401 may be identified as a central region of the boundary region 301. Additionally, the portion 401 may be identified through any other suitable process, for example, using contrasting patterns (e.g., features of printed or etched letters), identifiable indicia (e.g., the dot over the letter "i" or "j"), or any other process. Moreover, the portion 401 may be identified as a percent surface area at a central or predefined corner of the boundary region 301. Other methods of identifying the portion 401 may also be applicable to embodiments of the invention, and exhaustive description of every form is omitted herein for the sake of brevity.

Upon identification of the portion 401, a number of nodes contained within each grain region may be quantified as illustrated. In this example, grain regions proximal to the optical fiducial marker 402 (or alternatively central to the portion 401) have been quantified as having the number of nodes illustrated. As shown, some of the regions have an equal number of nodes, albeit of different total surface area. Therefore, using a simple algorithm consisting of identifying a central grain region proximal the fiducial marker 402 (in this example having 8 nodes), identifying the grain region immediately north (in this example having 6 nodes), and subsequently moving clockwise about the central region and quantifying nodes, an example unique serial number would be "864584485". This number may be augmented or reduced according to any number of desired digits for the unique identifier. Similarly, other pattern recognition algorithms may be used (e.g., moving counter-clockwise, in parallel rows, in vertical rows, along an identifiable edge, about a helix, etc.). Furthermore, other attributes may also be used rather than a number of nodes.

For example, a crystal orientation of each grain boundary region may be identified. Thereafter, a pattern of crystal orientation changes between each region may be used to quantify the underlying pattern as a unique serial number. The crystal orientations may be interpreted through one or both of an extruding plane {X,Y,Z} and an extruding direction <X,Y,Z> to use in quantifying a value for each grain region.

Additionally, other quantifiable surface attributes relating to individual grain regions may be used, including relative color, darkness, reflectivity, and other suitable attributes. Moreover, an image of a portion or entirety of the boundary region 301 may also serve as a form of product or part identification, and may be compared to images stored in a database during device manufacturing. The images may be compared through direct image-comparison or pattern recognition algorithms to determine a match and identifying counterfeit parts (e.g., parts not having matched images in the database).

As described above, a plurality of forms of identification may be associated with a portion of a surface of a part. The part may be a metallic part having a plurality of grain boundary regions associated therewith that form a unique pattern associated with the part. The grain boundary regions may be interpreted to form a unique serial number, and/or may be imaged and stored as a record of a part.

Figure 5:
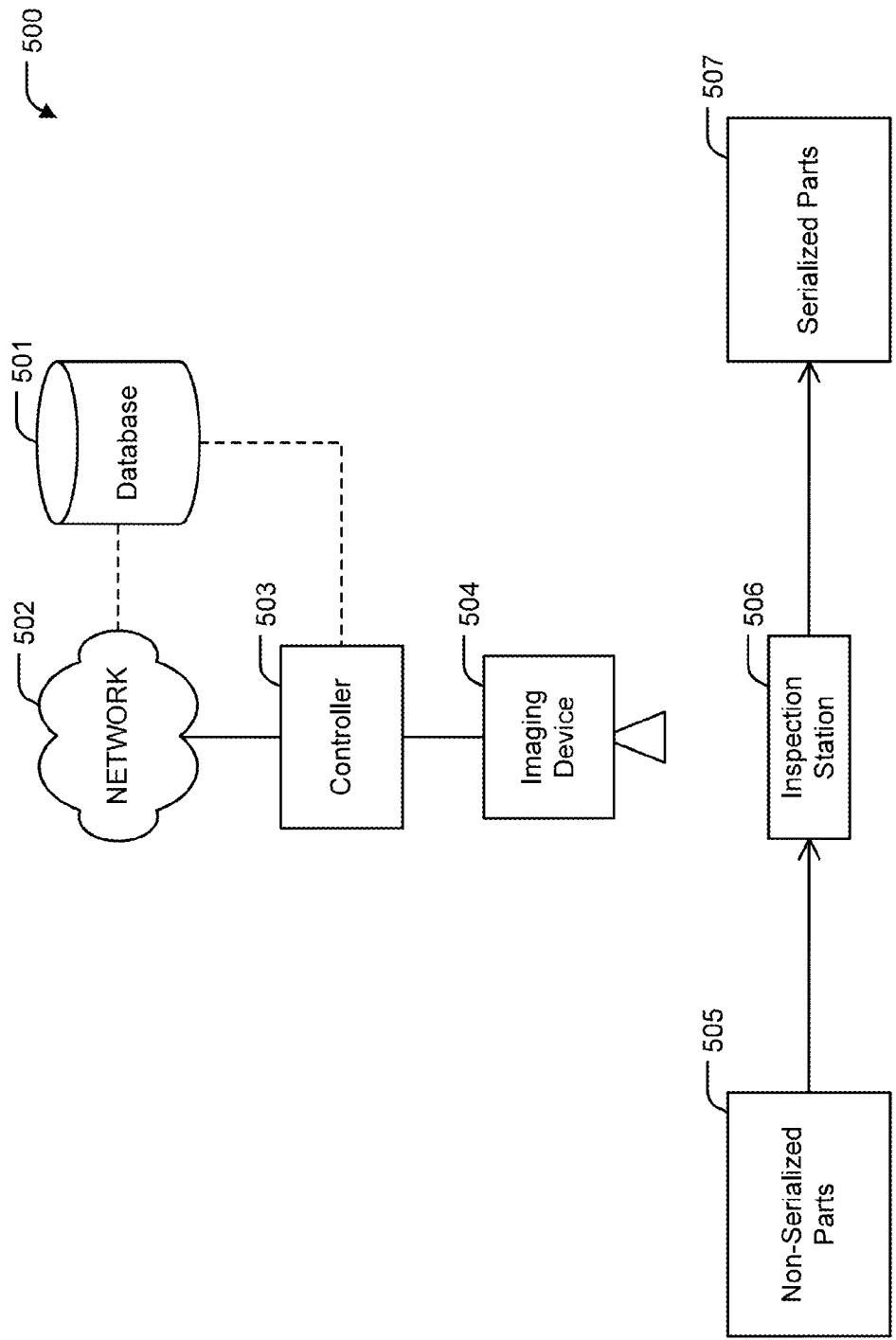
FIG. 5 is a system for assigning a unique identifier to a part or device, according to an embodiment of the invention.

FIG. 5 illustrates a system 500 for assigning a unique identifier to a part or device, according to an embodiment of the invention. As illustrated, the system 500 includes a database 501 configured to store serial numbers, part identifiers, and/or associated images. The database 501 may be any suitable database, including a relational database, which may be queried with a product serial number and/or image of a boundary region to determine if a part is counterfeit and/or the manufacturing origins of the queried part.

The database 501 may be in communication with a controller 503 over a network 502, or may be in direct communication with the controller 503 over one or more communication channels. The controller 503 may be a computer processing apparatus configured to translate images of a boundary region of a part into a unique serial number of identifier, and/or relay the same for storage in the database 501. The controller 503 may include a memory for storing computer executable instructions executable by a processor contained therein, the computer executable instructions directing the processor to perform one or more portions of the methods described herein.

The system 500 may further include an imaging device 504 in communication with the controller 503. The imaging device 504 may be any suitable imaging device capable of capturing an image of the surface of a part within, about, or containing at least a portion of a defined boundary region. The imaging device 504 may include one or more optical lenses and light sources, for example, for capturing images on a microscopic scale. The imaging device may also include other forms of image capture, including non-optical images (infrared, ultraviolet) and or spectrometer measurements as an alternative or in combination with traditional imaging.

As further show, the system 500 includes inspection station 506 configured to receive non-serialized parts 505 for inspection and subsequent serialization. The serialized parts 507 may also be re-inspected for counterfeit verification or other purposes. The inspection station 506 may be any suitable station, including a support member for supporting a part or device for imaging with the imaging device 504.

One or both of the imaging device 504 and the inspection station 506 may include translation stages for movement of the supported part relative to an imaging sensor of the imaging device 504. In this manner, a support part (e.g., placed in the inspection station 506) may be moved in at least one plane to allow for locating and imaging a defined boundary area.

The system 500 may be a relatively automated system integrated with a manufacturing line. As such, the controller 503 may be configured to perform one or more methods as described below, including methods of automated assignment of unique identifiers to a plurality of manufactured parts through controlling/directing components of the system 500 to repeatedly assign unique identifiers as described below.

Figure 6:
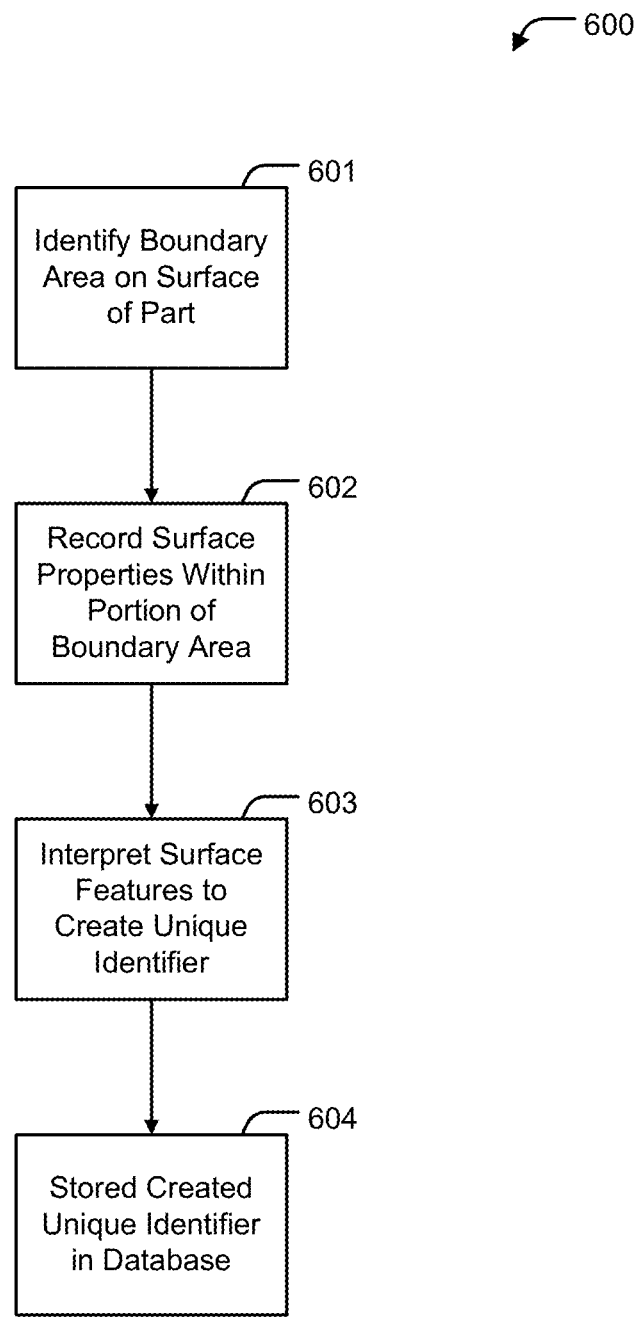
FIG. 6 is a flowchart of a method of assigning a unique identifier to a part or device, according to an embodiment of the invention.

FIG. 6 is a flowchart of a method 600 of assigning a unique identifier to a part or device, according to an embodiment of the invention. The method 600 includes identifying a boundary area on a surface of a part at block 601. The identifying may be facilitated through identification of a known feature, such as, for example, a corner, edge, indicia (e.g., letter or portion of a letter), change in contrast, or receipt of coordinates relative to the surface of the part. The boundary area may be a region of the surface of the part which includes identifiable or translatable surface features which form a unique pattern. For example, translatable surface features may include surface features such as grain patterns, crystal orientations, reflectivity, or other features which can be quantified, measured, and/or recorded (e.g., through images or otherwise). Therefore, the surface features may be translated into a unique part identifier or serial number.

The method 600 further includes recording surface properties and/or features within at least a portion of the boundary area at block 602. The recording may include imaging, reflectivity measurements of the surface features, spectrum measurements of the surface features, or other forms of recording.

The method 600 further includes interpreting the recorded surface properties and/or features to create a unique part identifier at block 603. The interpreting may include any form of interpretation discussed above, including pattern recognition, quantification, measuring, and/or algorithmic assignment of individual digits of a serial number associated with surface features in a repeatable manner. The individual digits may be based on individual surface features (e.g., grain boundary patterns), transitions between adjacent surface features (e.g., changes in crystal orientation), multiple surface features (e.g., total number of nodes within a predetermined region of surface area), or any other suitable approach to quantifying surface features.

The method 600 further includes storing the created unique part identifier in a database at block 604. The storing may include associating the unique part identifier with the actual part, storage of the actual identification or serial number, and/or storing of the recorded surface features as an image, images, processed image, and/or processed group of images.

The method 600 may further include other steps, acts, and/or functions not explicitly illustrated and described, including application of a label with indicia representative of the created identifier, etching of the surface of the part to include indicia representative of the created identifier, and/or any other desired functions or steps.

Figure 7:
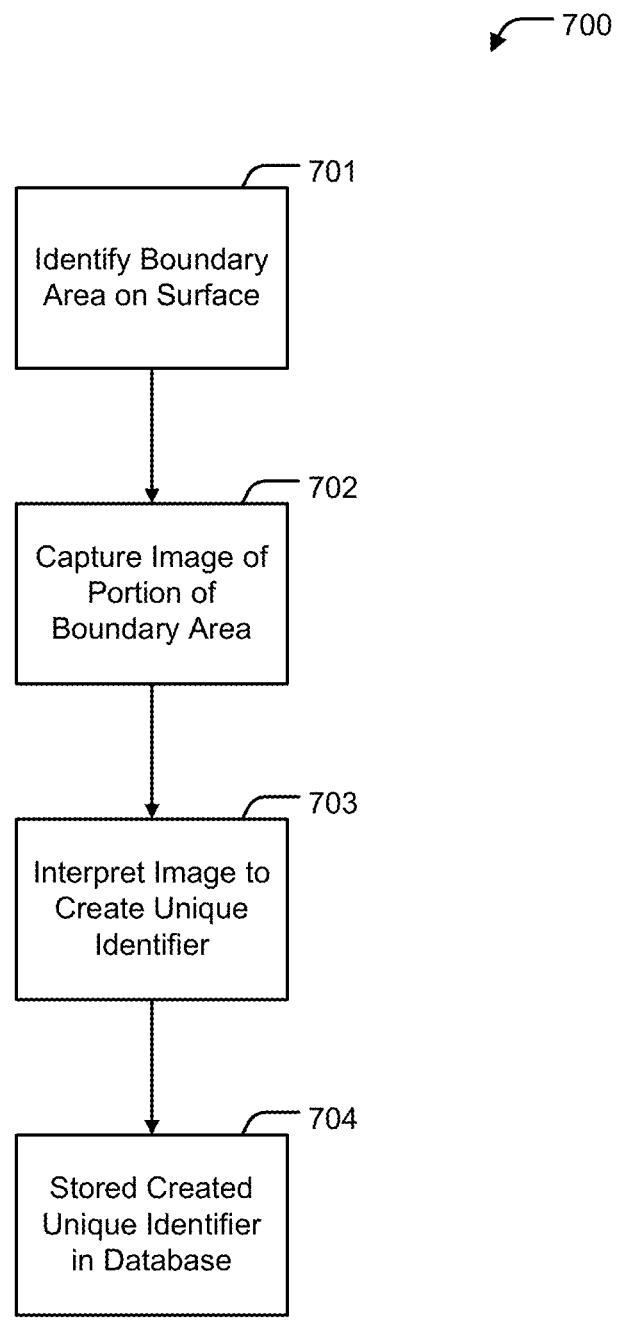
FIG. 7 is a flowchart of a method of assigning a unique identifier to a part or device, according to an embodiment of the invention.

As described above, recording of the surface features may be facilitated through an imaging device. FIG. 7 is a flowchart of a method 700 of assigning a unique identifier to a part or device using a system comprising an imaging device, according to an embodiment of the invention.

The method 700 includes identifying a boundary area on a surface of a part at block 701. The identifying may be facilitated through identification of a known feature, such as, for example, a corner, edge, indicia (e.g., letter or portion of a letter), change in contrast, or receipt of coordinates relative to the surface of the part. The boundary area may be a region of the surface of the part which includes identifiable or translatable surface features which form a unique pattern. For example, translatable surface features may include surface features such as grain patterns, crystal orientations, reflectivity, or other features which can be quantified, measured, and/or recorded (e.g., through images or otherwise). Therefore, the surface features may be translated into a unique part identifier or serial number.

The method 700 further includes capturing an image of at least a portion of the boundary area at block 702. The capturing may include using an imaging device somewhat similar to imaging device 504 to capture/record an image of the portion of the defined boundary area.

The method 700 further includes interpreting the captured image to create a unique part identifier at block 703. The interpreting may include any form of interpretation discussed above, including pattern recognition, quantification, measuring, and/or algorithmic assignment of individual digits of a serial number associated with surface features identifiable in the captured image in a repeatable manner. The individual digits may be based on individual surface features (e.g., grain boundary patterns), transitions between adjacent surface features (e.g., changes in crystal orientation), multiple surface features (e.g., total number of nodes within a predetermined region of surface area), or any other suitable approach to quantifying surface features.

The method 700 further includes storing the created unique part identifier in a database at block 704. The storing may include associating the unique part identifier with the actual part, storage of the actual identification or serial number, and/or storing of the captured image.

The method 700 may further include other steps, acts, and/or functions not explicitly illustrated and described, including application of a label with indicia representative of the created identifier, etching of the surface of the part to include indicia representative of the created identifier, and/or any other desired functions or steps.

As described above, surface feature patterns on surfaces of a part may be unique across a plurality or relatively large number of parts. Therefore, unique identifiers may be interpreted or quantified through analysis of these surface features. However, other forms of unique identification may also be appropriate, including integration of conventional number assignment with identification/recording of surface features and underlying patterns as presented below with reference to FIG. 8.

Figure 8:
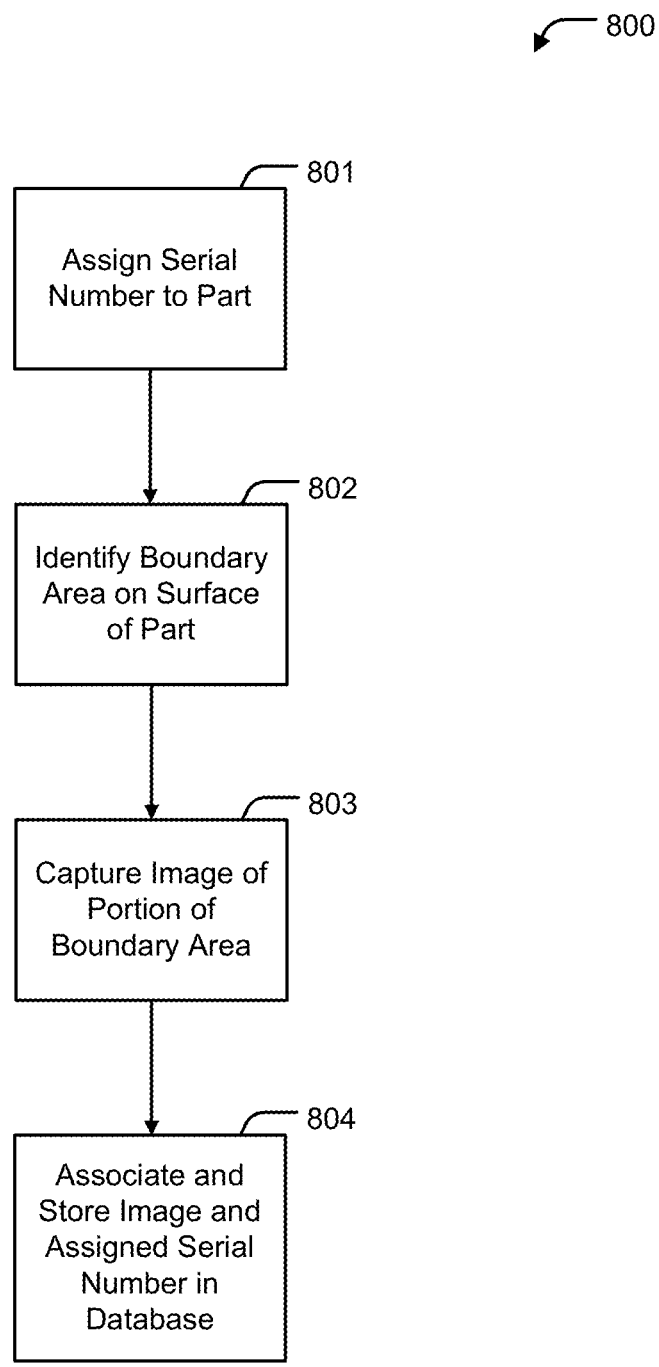
FIG. 8 is a flowchart of a method of assigning a unique identifier to a part or device, according to an embodiment of the invention.

FIG. 8 is a flowchart of a method 800 of assigning a unique identifier to a part or device, according to an embodiment of the invention. The method 800 may include assigning a serial number to a part at block 801. The assigning may include any desired form of assigning, including generation of a random serial number of a predetermined format to the part. Additionally, the assigning may include generation of a serialized number of a predetermined format to the part. Furthermore, the assigning may include retrieving an unused serial number from a pool of available serial numbers and assigning the retrieved number to the part.

Thereafter, the method 800 includes identifying a boundary area on a surface of the part at block 801. The identifying may be facilitated through identification of a known feature, such as, for example, a corner, edge, indicia (e.g., letter or portion of a letter), change in contrast, or receipt of coordinates relative to the surface of the part. The boundary area may be a region of the surface of the part which includes identifiable or translatable surface features which form a unique pattern. For example, translatable surface features may include surface features such as grain patterns, crystal orientations, reflectivity, or other features which can be quantified, measured, and/or recorded (e.g., through images or otherwise). Therefore, the surface features may be translated into a unique part identifier or serial number.

The method 800 further includes capturing an image of at least a portion of the boundary area at block 802. The capturing may include using an imaging device somewhat similar to imaging device 504 to capture/record an image of the portion of the defined boundary area.

The method 800 further includes storing the assigned serial number with the captured image in a database at block 804. The storing may include associating the serial number with the actual part and the captured image, storage of the actual identification or serial number, and/or storing of the captured image. In this manner, a reference of the unique surface features (e.g., through the captured image) may be associated with the assigned serial number and referenced at any subsequent time. Therefore, the assigned serial number may be verified through analysis of the defined boundary area such that counterfeiting is made difficult.

The method 800 may further include other steps, acts, and/or functions not explicitly illustrated and described, including application of a label with indicia representative of the assigned serial number, etching of the surface of the part to include indicia representative of the assigned serial number, and/or any other desired functions or steps.

As described above, a plurality of methods of assigning/creating unique identifiers based on surface features of parts may include a plurality of steps/functions including defining a boundary area on at least one surface of the manufactured part, recording surface properties within, or capturing an image of, a portion of the boundary area, interpreting the recorded surface properties or captured image with a pattern recognition algorithm to create the unique identifier, and storing the unique identifier in a database. The methods may also integrate pre-assigned serial numbers through storage of the image as well.

Hereinafter, methods of verifying unique identifiers are described in greater detail with reference to FIGS. 9-11.

Figure 9:
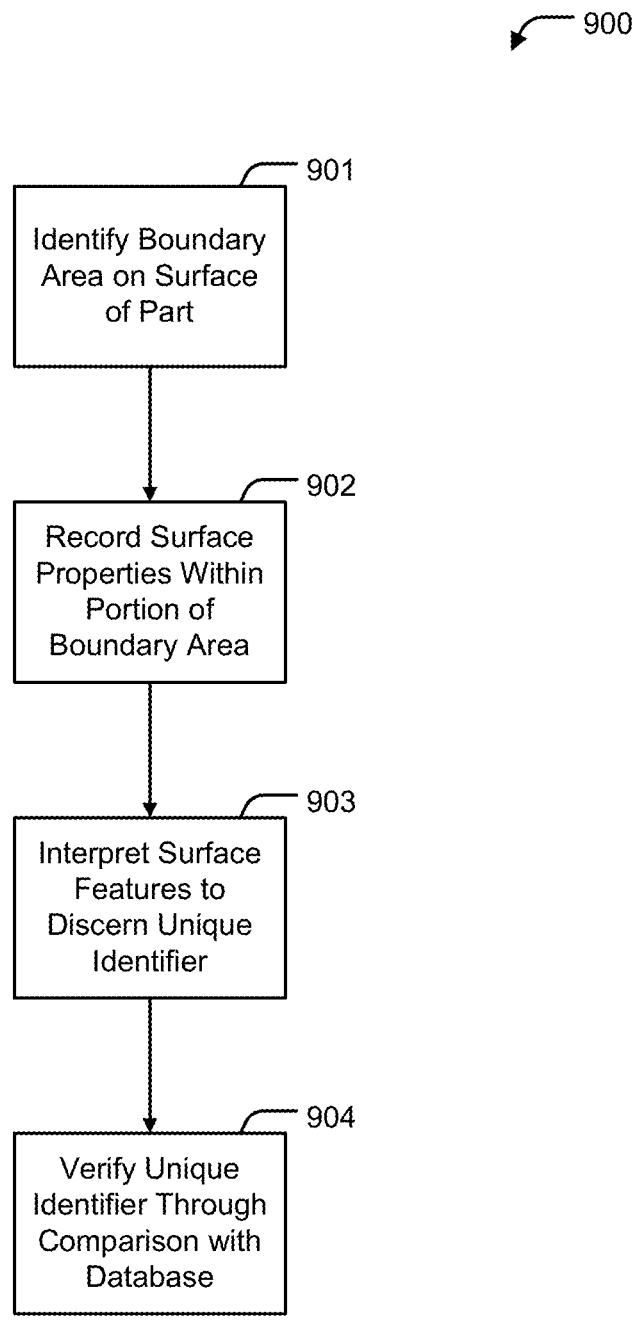
FIG. 9 is a flowchart of a method of verifying a unique identifier of a part or device, according to an embodiment of the invention.
Figure 10:
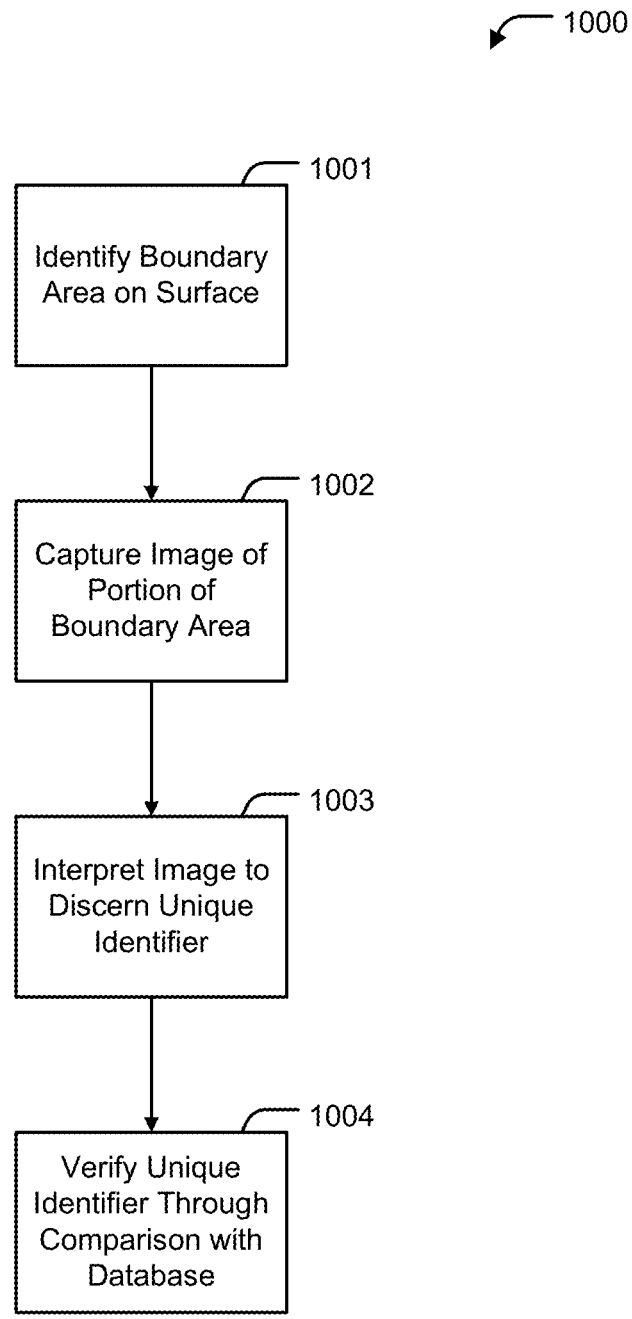
FIG. 10 is a flowchart of a method of verifying a unique identifier of a part or device, according to an embodiment of the invention.

FIG. 9 is a flowchart of a method 900 of verifying a unique identifier of a part or device, according to an embodiment of the invention. The method 900 includes identifying a boundary area on a surface of a part at block 901. The identifying may be facilitated through identification of a known feature, such as, for example, a corner, edge, indicia (e.g., letter or portion of a letter), change in contrast, or receipt of coordinates relative to the surface of the part. The boundary area may be a region of the surface of the part which includes identifiable or translatable surface features which form a unique pattern. For example, translatable surface features may include surface features such as grain patterns, crystal orientations, reflectivity, or other features which can be quantified, measured, and/or recorded (e.g., through images or otherwise).

The method 900 further includes recording surface properties and/or features within at least a portion of the boundary area at block 902. The recording may include imaging, reflectivity measurements of the surface features, spectrum measurements of the surface features, or other forms of recording.

The method 900 further includes interpreting the recorded surface properties and/or features to discern the previously created unique part identifier at block 903. The interpreting may include any form of interpretation discussed above, including pattern recognition, quantification, measuring, and/or algorithmic assignment of individual digits of a serial number associated with surface features. The individual digits may be based on individual surface features (e.g., grain boundary patterns), transitions between adjacent surface features (e.g., changes in crystal orientation), multiple surface features (e.g., total number of nodes within a predetermined region of surface area), or any other suitable approach to quantifying surface features which was used to create the unique part identifier.

The method 900 further includes verifying the discerned unique part identifier through comparison with a database at block 904. The verifying may include any suitable form of verification, including querying the database for existence of the discerned part identifier.

As described above, recording of the surface features may be facilitated through an imaging device. FIG. 10 is a flowchart of a method of verifying a unique identifier of a part or device using an imaging device, according to an embodiment of the invention.

The method 1000 includes identifying a boundary area on a surface of a part at block 1001. The identifying may be facilitated through identification of a known feature, such as, for example, a corner, edge, indicia (e.g., letter or portion of a letter), change in contrast, or receipt of coordinates relative to the surface of the part. The boundary area may be a region of the surface of the part which includes identifiable or translatable surface features which form a unique pattern. For example, translatable surface features may include surface features such as grain patterns, crystal orientations, reflectivity, or other features which can be quantified, measured, and/or or recorded (e.g., through images or otherwise).

The method 1000 further includes capturing an image of at least a portion of the boundary area at block 1002. The capturing may include using an imaging device somewhat similar to imaging device 504 to capture/record an image of the portion of the defined boundary area.

The method 1000 further includes interpreting the captured image to discern the previously created unique part identifier at block 1003. The interpreting may include any form of interpretation discussed above, including pattern recognition, quantification, measuring, and/or algorithmic assignment of individual digits of a serial number associated with surface features identifiable in the captured image. The individual digits may be based on individual surface features (e.g., grain boundary patterns), transitions between adjacent surface features (e.g., changes in crystal orientation), multiple surface features (e.g., total number of nodes within a predetermined region of surface area), or any other suitable approach which was used to create the unique part identifier.

The method 1000 further includes verifying the discerned unique part identifier through comparison with a database at block 1004. The verifying may include any suitable form of verification, including querying the database for existence of the discerned part identifier.

As described above, other forms of unique identification and verification may also be appropriate, including integration of conventional number assignment with identification/recording of surface features and underlying patterns as presented below with reference to FIG. 11.

Figure 11:
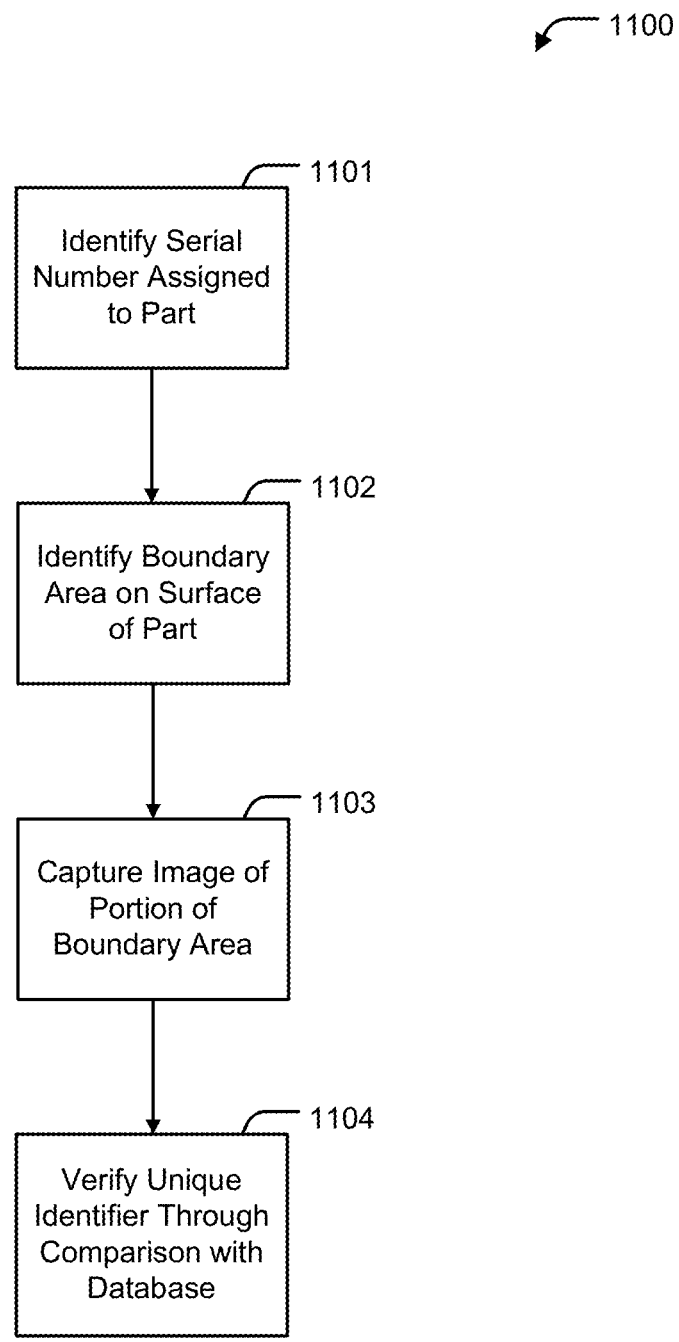
FIG. 11 is a flowchart of a method of verifying a unique identifier of a part or device, according to an embodiment of the invention.

FIG. 11 is a flowchart of a method of verifying a unique identifier of a part or device, according to an embodiment of the invention. The method 1100 may include identifying a serial number assigned to the part at block 1101. The identifying may include retrieving the assigned number from a database, reading/entering the serial number as identified through indicia marked on the part's surface, or any suitable form of identifying.

Thereafter, the method 1100 includes identifying a boundary area on a surface of the part at block 1101. The identifying may be facilitated through identification of a known feature, such as, for example, a corner, edge, indicia (e.g., letter or portion of a letter), change in contrast, or receipt of coordinates relative to the surface of the part.

The method 1100 further includes capturing an image of at least a portion of the boundary area at block 1102. The capturing may include using an imaging device somewhat similar to imaging device 504 to capture/record an image of the portion of the defined boundary area.

The method 1100 further includes verifying the identified serial number and the captured image through comparison with a database at block 1104. The verifying may include any suitable form of verification, including querying the database for existence of the identified serial number associated with the captured image.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method of generating a unique identifier for a manufactured part, the method comprising:
identifying a reference feature on a surface of the manufactured part;
identifying a boundary area on the surface of the manufactured part based on a location of the reference feature;
quantifying one or more naturally occurring nodes within non-uniform boundary regions of the boundary area;
interpreting the one or more naturally occurring nodes based on a node total corresponding to each of the non-uniform boundary regions; and
generating the unique identifier based on a result of the interpreting.

2. The method of claim 1, wherein the reference feature is a corner of the manufactured part, an edge of the manufactured part, an indicia disposed on the surface of the manufactured part, a fiducial marker disposed on the surface of the manufactured part, or change in contrast on the surface of the manufactured part.

3. The method of claim 1, wherein the boundary area is a region of the surface of the manufactured part which includes identifiable surface features which form a unique pattern.

4. The method of claim 3, wherein the surface is made from metal and the identifiable surface features comprise grain boundary patterns of the metal or crystal orientations of the metal.

5. The method of claim 1, wherein quantifying one or more naturally occurring nodes comprises imaging, measuring reflectivity, or measuring spectrum output of the non-uniform boundary regions of the boundary area.

6. The method of claim 1, wherein interpreting the one or more naturally occurring nodes comprises algorithmic assignment of individual digits of a serial number associated with surface features in a repeatable manner.

7. The method of claim 6, wherein the individual digits are based on individual surface features.

8. The method of claim 6, wherein the individual digits are based on a total number of the one or more naturally occurring nodes of the non-uniform boundary regions.

9. The method of claim 6, wherein the individual digits are based on transitions between adjacent surface features.

10. The method of claim 9, wherein the transitions between the adjacent surface features are changes in crystal orientation from a first surface feature to an adjacent surface feature.

11. The method of claim 6, wherein the individual digits are based on groups of surface features.

12. The method of claim 1, further comprising:
applying indicia representative of the unique identifier to the surface of the manufactured part.

13. The method of claim 12, wherein the applying comprises etching the indicia on the surface of the manufactured part.

14. A non-transitory computer readable storage medium configured to store instructions that, when executed by a processor communicatively coupled with a computing device, cause the computing device to carry out steps that include:
- identifying a reference feature on a surface of a manufactured part;
- identifying a boundary area on the surface of the manufactured part based on a location of the reference feature;
- identifying a non-uniform boundary region of multiple non-uniform boundary regions within the boundary area;
- quantifying one or more naturally occurring nodes within a perimeter of the non-uniform boundary region of the boundary area, wherein the one or more naturally occurring nodes result from a material property of the manufactured part;
- interpreting the one or more naturally occurring nodes based on a pattern recognition algorithm; and
- generating a unique identifier based on a result of the pattern recognition algorithm.

15. The non-transitory computer readable storage medium of claim 14, wherein the boundary area is a region of the surface of the manufactured part which includes identifiable surface features which form a unique pattern.

16. The non-transitory computer readable storage medium of claim 15, wherein the surface is made from metal and the identifiable surface features comprise grain boundary patterns of the metal or crystal orientations of the metal.

17. The non-transitory computer readable storage medium of claim 14, wherein interpreting the one or more naturally occurring nodes comprises algorithmic assignment of individual digits of a serial number associated with surface features in a repeatable manner.

18. A system configured to assign a unique identifier to a manufactured part, the system comprising:
- an imaging device;
- a processor; and
- a memory configured to store instructions that, when executed by the processor, cause the system to carry out steps that include:
- identifying a reference feature on a surface of the manufactured part;
- identifying a boundary area on the surface of the manufactured part based on a location of the reference feature;
- identifying one or more naturally occurring nodes within non-uniform boundary regions of the boundary area according to a surface feature of each of the one or more naturally occurring nodes, wherein the one or more naturally occurring nodes result from a material property of a grain region on the manufactured part;
- quantifying the one or more naturally occurring nodes within the non-uniform boundary regions; and
- generating the unique identifier based on a result of the quantifying.

19. The system of claim 18, wherein the imaging device comprises an image sensor and at least one lens, and the image sensor is configured to record an image of identifiable surface features of the manufactured part on a microscopic scale.

20. The system of claim 18, wherein generating the unique identifier comprises automatically assigning unique identifiers to a plurality of manufactured parts.

21. The method of claim 1, wherein a portion of the reference feature defines in part the boundary area.

\* \* \* \* \*